United States Patent
Bruno et al.

(10) Patent No.: US 12,058,047 B2
(45) Date of Patent: Aug. 6, 2024

(54) EDGE NODE WORKLOAD ACQUISITION FOR DISTRIBUTION OF EDGE WORKLOADS

(71) Applicant: Dell Products L.P., Round Rock, TX (US)

(72) Inventors: Eric Bruno, Shirley, NY (US); Amy Seibel, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 17/682,256

(22) Filed: Feb. 28, 2022

(65) Prior Publication Data

US 2023/0275838 A1    Aug. 31, 2023

(51) Int. Cl.
*H04L 47/12* (2022.01)
*H04L 47/62* (2022.01)

(52) U.S. Cl.
CPC .............. *H04L 47/12* (2013.01); *H04L 47/62* (2013.01)

(58) Field of Classification Search
CPC ................................ H04L 47/12; H04L 47/62
See application file for complete search history.

(56) References Cited

U.S. PATENT DOCUMENTS

| | | | | |
|---|---|---|---|---|
| 8,527,645 | B1 * | 9/2013 | Proffit | G06F 9/5027 718/103 |
| 11,079,968 | B1 * | 8/2021 | Patel | G06F 11/2025 |
| 11,336,582 | B1 * | 5/2022 | Francini | H04L 47/28 |
| 2004/0054999 | A1 * | 3/2004 | Willen | G06F 9/5044 718/103 |
| 2019/0056974 | A1 * | 2/2019 | Burke | G06F 9/4881 |
| 2020/0110676 | A1 * | 4/2020 | Volos | G06F 11/203 |
| 2020/0389410 | A1 * | 12/2020 | Guim Bernat | H04L 67/10 |

FOREIGN PATENT DOCUMENTS

| | | | | |
|---|---|---|---|---|
| CN | 114116149 | A | * 3/2022 | |
| DE | 102011007603 | A1 | * 7/2012 | G06F 9/4881 |

OTHER PUBLICATIONS

Raj, R Joshua Samuel, et al. "Improved DHOA-Fuzzy Based Load Scheduling in IoT Cloud Environment". Computers, Materials, & Continua 71.2: 4101-4114. Henderson: Tech Science Press. (2022) (Year: 2022).*

Manzoor, Sohaib, et al. "Modeling of Wireless Traffic Load in Next Generation Wireless Networks". Mathematical Problems in Engineering2021 Hindawi Limited. (2021) (Year: 2021).*

(Continued)

*Primary Examiner* — Nicholas R Taylor
*Assistant Examiner* — Angela Widhalm De Rodriguez
(74) *Attorney, Agent, or Firm* — Ryan, Mason & Lewis, LLP

(57) ABSTRACT

A method comprises executing a workload acquiring algorithm at a first edge node of a plurality of edge nodes to pull at least one workload of a plurality of workloads from a workload queue corresponding to a second edge node of the plurality of edge nodes. In one example, the first edge node may be a component of a first edge location, and the method may further comprise providing the first edge node with access to one or more workloads from one or more workload queues corresponding to one or more edge nodes from a second edge location different from the first edge location.

20 Claims, 8 Drawing Sheets

(56) References Cited

OTHER PUBLICATIONS

Xu Shihao et al. "A collaborative cloud-edge computing framework in distributed neural network". EURASIP Journal on Wireless Communications and Networking 2020.1New York: Springer Nature B.V. (Dec. 2020) (Year: 2020).*
Wikipedia, "Work Stealing," https://en.wikipedia.org/w/index.php?title=Work_stealing&oldid=1063271772, Jan. 2, 2022, 4 pages.
Insight, "Workload," https://www.insight.com/en_US/glossary/w/workload.html, Accessed Feb. 28, 2022, 3 pages.
U.S. Appl. No. 17/682,077 filed in the name of Amy N. Seibel et al. on Feb. 28, 2022, and entitled "Edge Utility System with Dynamic Aggregation of Edge Resources Across Multiple Edge Computing Sites."

* cited by examiner

EDGE NODE WORKLOAD ACQUISITION FOR DISTRIBUTION OF EDGE WORKLOADS

FIELD

The field relates generally to computing environments and, more particularly, to the implementation of edge node workload acquisition in connection with edge workload distribution.

BACKGROUND

An edge computing architecture moves at least a portion of data processing to the periphery of a network to be closer to a data source rather than to a centralized location, e.g., data center. For example, instead of transmitting raw data to a data center to be processed and analyzed, such tasks or workloads are performed at or near locations where the data is actually generated. In this manner, for example, network parameters such as bandwidth can be increased, while network parameters such as latency and congestion can be reduced, thus improving overall network reliability.

Workloads may be allocated for processing to different nodes of an edge computing architecture. However, due at least to availability constraints of one or more edge nodes, workload scheduling can pose significant technical problems.

SUMMARY

Embodiments provide techniques for distribution of workloads to nodes in an edge computing architecture.

For example, in one illustrative embodiment, a method comprises executing a workload acquiring algorithm at a first edge node of a plurality of edge nodes to pull at least one workload of a plurality of workloads from a workload queue corresponding to a second edge node of the plurality of edge nodes.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide techniques for rebalancing queued workloads to different edge nodes which have become idle and are available to process additional workloads. Technical solutions illustratively described herein provide a self-balancing and self-governing system that enables improved flow of workloads across available edge nodes, regardless of how the workloads are initially assigned.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising edge computing, cloud computing and storage systems, as well as other types of processing systems comprising various combinations of physical and virtual processing resources.

Figure 1:
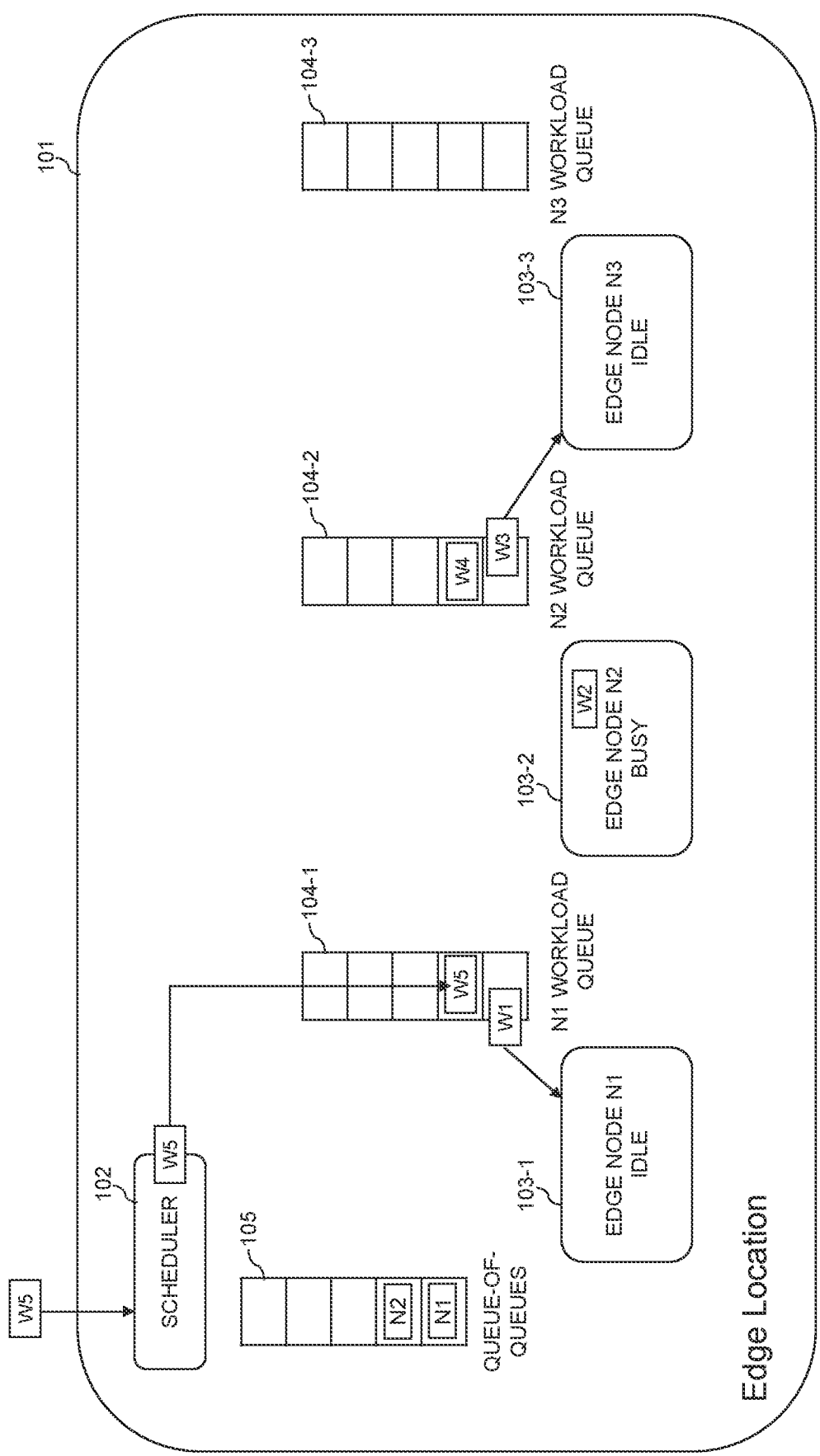
FIG. 1 is a block diagram of an edge location implementing a workload acquisition algorithm in an illustrative embodiment.

FIG. 1 depicts an edge location 101 implementing a workload acquisition algorithm (illustratively referred to herein as a "workload stealing algorithm") in an illustrative embodiment. The edge location 101 comprises edge node N1 103-1, edge node N2 103-2 and edge node N3 103-3 (collectively, edge nodes 103). The edge nodes 103 can comprise, for example, desktop, laptop or tablet computers, servers, storage devices or other types of processing devices capable of processing workloads W1, W2, W3, W4 and W5 (collectively workloads W). Such devices are examples of what are more generally referred to herein as "processing devices." Some of these processing devices are also generally referred to herein as "computers." The edge nodes 103 may also or alternately comprise virtualized computing resources, such as virtual machines (VMs), containers, etc. The edge nodes 103 in some embodiments comprise respective computers associated with a particular company, organization or other enterprise. Although three edge nodes 103 are shown, the embodiments are not necessarily limited thereto, and more or less than three edge nodes 103 may be components of edge location 101. Similarly, although five workloads W are shown, the embodiments are not necessarily limited thereto, and more or less than five workloads W may be received and processed at edge location 101.

Workloads W comprise, for example, data and applications running as single components or several components working together, with the edge nodes 103 providing computational resources to allow workloads to complete tasks. The size of a workload W may be dependent on the amount of data and applications included in a given workload W. Certain edge nodes 103 may be better suited for certain types of workloads W, depending on the characteristics of the workloads W.

The terms "client," "customer," "administrator" or "user" herein are intended to be broadly construed so as to encompass numerous arrangements of human, hardware, software or firmware entities, as well as combinations of such entities. In some embodiments, users may refer to customers, clients and/or administrators of computing environments for which workload execution is being performed. Compute and/or storage services (e.g., at least a portion of the available services and functionalities provided by the edge nodes 103) may be provided for users under a Platform-as-a-Service (PaaS) model, an Infrastructure-as-a-Service (IaaS) model, a Function-as-a-Service (FaaS) model, a Containers-as-a-Service (CaaS) model and/or a Storage-as-a-Service (STaaS) model, including cloud-based PaaS, IaaS, FaaS, CaaS and STaaS environments, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Although not explicitly shown in FIG. 1, one or more input-output devices such as keyboards, displays or other types of input-output devices may be used to support one or more user interfaces to the edge nodes 103, as well as to support communication between edge nodes 103 and connected devices and/or other related systems and devices not explicitly shown.

A network or networks referenced herein may be implemented using multiple networks of different types. For example, a network may comprise a portion of a global computer network such as the Internet, although other types of networks can be part of the network including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, a scheduler 102 receives workloads W and distributes the workloads W by placing them within N1 workload queue 104-1, N2 workload queue 104-2 and/or N3 workload queue 104-3 (collectively, workload queues 104) respectively corresponding to each edge node N1 103-1, N2 103-2 and N3 103-3. For example, as shown in FIG. 1, the scheduler 102 assigns workloads W5 and W1 to N1 workload queue 104-1, workloads W2, W3 and W4 to N2 workload queue 104-2 and no workloads to N3 workload queue 104-3. Workloads W shown in a given edge node 103 (e.g., workload W2 in edge node N2 103-2) were previously in the workload queue 104 of the given edge node 103 unless otherwise specified. The scheduler 102 may distribute workloads W across edge nodes 103 according to different algorithms. As can be seen in FIG. 1, a queue-of-queues 105 (also referred to herein as a "primary queue") is created in edge location 101 by, for example, the scheduler 102 or other computing device in edge location 101. In more detail, when workloads W are added to workload queues 104 of edge nodes 103, references to the workload queues 104 (as shown by the references to N1 and N2 in the queue-of-queues 105 in FIG. 1) are added to the queue-of-queues 105. When a given workload queue of an edge node becomes empty, the reference to that workload queue is removed from the queue-of-queues 105.

In FIG. 1, which represents a particular snapshot in time, edge node N2 103-2 is denoted as "busy" since it is processing workload W2. The other edge nodes N1 and N3 103-1 and 103-3 are denoted as "idle" since they are not processing workloads W at the particular snapshot in time. For example, edge node N1 103-1 is about to process workload W1 from its workload queue 104-1. In accordance with the embodiments, idle edge nodes are configured to execute a workload stealing algorithm to pull workloads W from workload queues of busy edge nodes to be processed by the idle edge nodes. For example, in FIG. 1, idle edge node N3 103-3 is stealing workload W3 from the N2 workload queue 104-2 of busy edge node N2 103-2 and is about to process workload W3. A technical solution of the embodiments is to configure idle edge nodes to actively pull workloads from other edge node workload queues, thereby providing a self-governing system that enables efficient workload processing distribution and utilization of available resources. For example, as workloads W are processed by the edge nodes 103, some edge nodes 103 may run out of workloads W to process before other edge nodes 103. These idle edge nodes 103 can steal work from the workload queue 104 of a busy edge node 103, resulting in higher throughput of completed workloads. In a non-limiting example, a first edge node of a plurality of edge nodes 103 processes workloads W in its workload queue until the workload queue is empty. Then, in executing a workload stealing algorithm, the first edge node pulls one or more workloads W from a workload queue corresponding to a second edge node of the plurality of edge nodes 103, and processes the one or more pulled workloads.

When a workload queue of a given edge node becomes empty after executing the workloads W therein, the reference to that workload queue is removed from the queue-of-queues 105. When the given edge node becomes idle, the idle edge node queries the queue-of-queues 105 to find a reference to a workload queue of another edge node having available workloads, and pulls the next workload from the workload queue of the other edge node. For example, referring to FIG. 1, idle edge node N3 103-1 finds the reference to the N2 workload queue 104-2 in the queue-of-queues 105 (e.g., N2) and pulls the next workload W3 from the N2 workload queue 104-2 of edge node N2 103-2 so that the workload W3 can be processed by edge node N3 103-3. When the queue-of-queues 105 is empty, this indicates there are no more workloads waiting to be processed, and edge nodes 103 can remain idle until the scheduler 102 places arriving workloads W into their workload queues 104, whereby the workload stealing process can again be performed.

Figure 2:
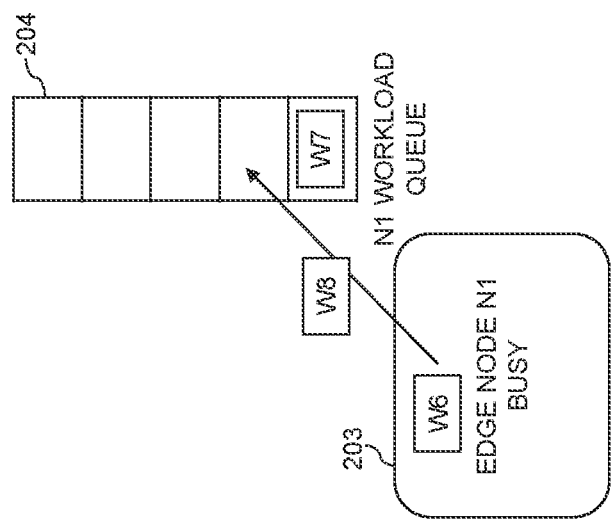
FIG. 2 is a block diagram of workload processing spawning a new workload at an edge node in an illustrative embodiment.

Edge nodes 103, while processing workloads W, may spawn (generate) new workloads that are then added to their corresponding workload queues 104. For example, referring to FIG. 2, an edge node N1 203 is busy processing a workload W6, which results in the generation of a new workload W8. The new workload W8 is added to the N1 workload queue 204 for edge node N1 203, which already includes workload W7. As spawning occurs, individual edge nodes 103/203 may become overburdened with extra workload processing, resulting in, for example, response latency. The embodiments provide a technical solution for this issue, whereby other edge nodes that may be idle can use a workload stealing algorithm to pull the newly spawned or other workloads from a workload queue of an overburdened edge node, thereby parallelizing workload processing.

Referring to the system 300 in FIG. 3, workload stealing can occur not only within a single edge location as described in connection with FIG. 1, but also between multiple edge locations E1 301 and E2 310. Similar to edge location 101, edge location E1 301 includes edge node E1N1 303-1, edge node E1N2 303-2 and edge node E1N3 303-3 (collectively, edge nodes 303) and edge location 310 includes edge node E2N1 313-1, edge node E2N2 313-2 and edge node E2N3 313-3 (collectively, edge nodes 313). E1 refers to a first edge location E1 301 and E2 refers to a second edge location E2 310, and N1-N3 refer to first, second and third edge nodes in each edge location E1 301 and E2 310. Also similar to FIG. 1, each of the edge nodes 303 correspond to respective workload queues comprising E1N1 workload queue 304-1, E1N2 workload queue 304-2 and E1N3 workload queue 304-3 (collectively, workload queues 304). Each of the edge nodes 313 correspond to respective workload queues comprising E2N1 workload queue 314-1, E2N2 workload queue 314-2 and E2N3 workload queue 314-3 (collectively, workload queues 314). Workloads W9, W10, W11, W12 and W13 (collectively workloads Wn) correspond to edge location E1 301 and workloads W14, W15 and W16 correspond to edge location E2 310 (collectively workloads Wx). Although three edge nodes 303 and 313 are shown in each edge location E1 301 and E2 310, the embodiments are not necessarily limited thereto, and more or less than three edge nodes 303 and 313 may be components of edge locations E1 or E2 301 or 310. Similarly, although five workloads Wn and three workloads Wx are shown in respective edge locations E1 301 and E2 310, the embodiments are not necessarily limited thereto, and more or less than the number of workloads Wn and Wx shown may be received and processed at edge locations E1 302 or E2 310.

Figure 3:
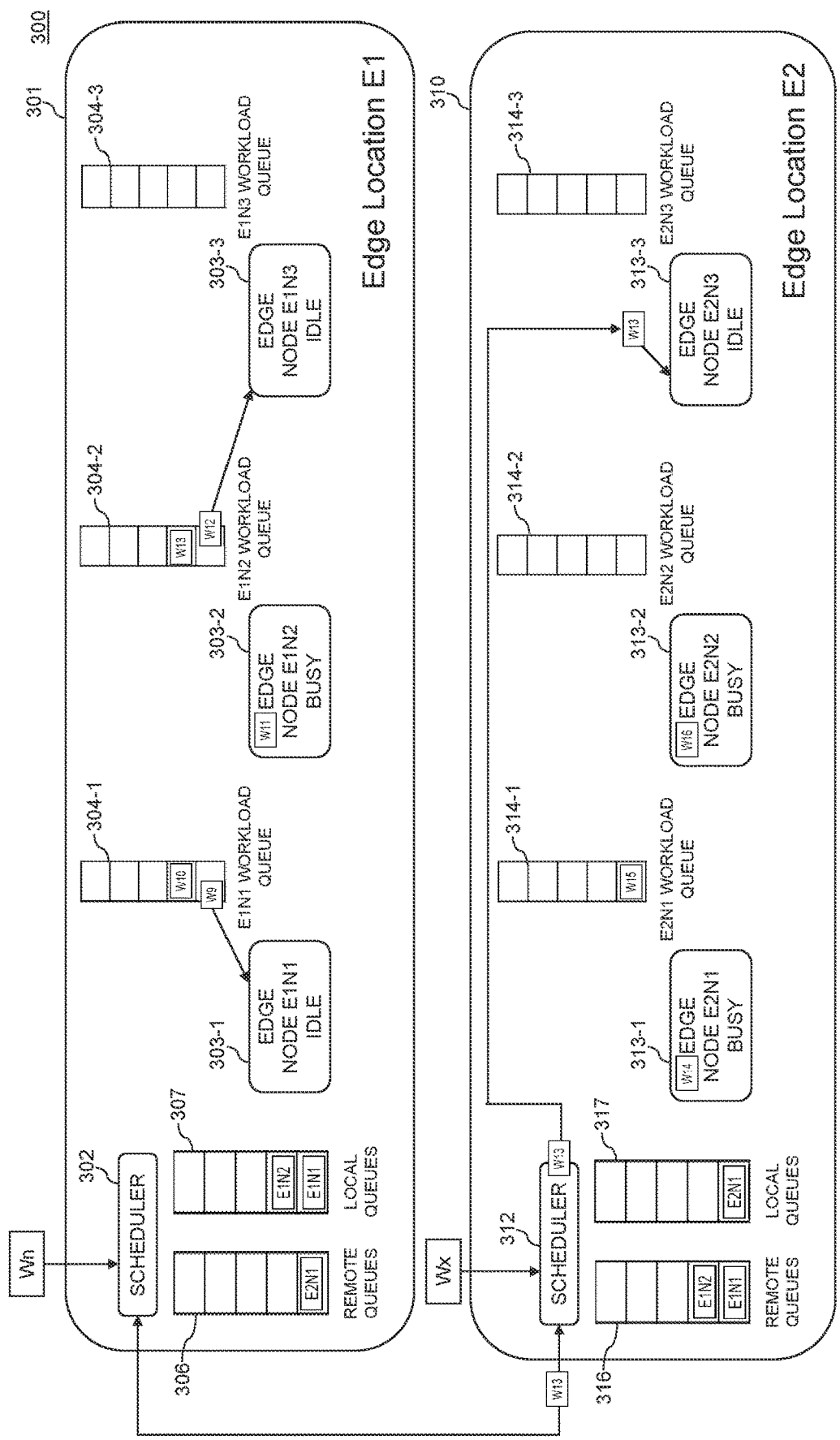
FIG. 3 is a block diagram depicting implementation of a workload acquisition protocol between schedulers corresponding to different edge locations in an illustrative embodiment.

As shown in FIG. 3, schedulers 302 and 312 respectively receive workloads Wn and Wx and distribute the workloads Wn and Wx by placing them within one or more of the workload queues 304 respectively corresponding to the edge nodes E1N1, E1N2 and E1N3 and within one or more of the workload queues 314 respectively corresponding to the edge nodes E2N1, E2N2 and E2N3. For example, as shown in FIG. 3, the scheduler 302 assigns workloads W9 and W10 to E1N1 workload queue 304-1, workloads W11, W12 and W13 to E1N2 workload queue 304-2 and no workloads to E1N3 workload queue 304-3. The scheduler 312 assigns workloads W14 and W15 to E2N1 workload queue 314-1, workload W16 to E2N2 workload queue 314-2 and no workloads to E2N3 workload queue 314-3. Workloads Wn or Wx shown in a given edge node 303 or 313 (e.g., workload W11 in edge node E1N2 303-2, workload W14 in edge node E2N1 313-1 and workload W16 in edge node E2N2 313-2) were previously in the workload queue 304 or 314 of the given edge node 303 or 313 unless otherwise specified.

As can be seen in FIG. 3, similar to the queue-of-queues 105 in edge location 101, edge location E1 301 maintains a reference to active workload queues 304 for edge nodes 303 in edge location E1 301 (local queues 307). Edge location E1 301 also maintains a reference to active workload queues 314 for edge nodes 313 in edge location E2 310 (remote queues 306). Like edge location E1 301, edge location E2 310 maintains a reference to active workload queues 314 for edge nodes 313 in edge location E2 310 (local queues 317), which is the same as the listing of remote queues 306 in edge location E1 301. Edge location E2 310 also maintains a reference to active workload queues 304 for edge nodes 303 in edge location E1 301 (remote queues 316), which is the same as the listing of local queues 307 in edge location E1 301. The references to the workload queues specify, for example, the edge location and the node (e.g., E1N1, E1N2, E2N1) to which the workload queue corresponds. When workloads Wn or Wx are added to workload queues 304 and 314 of edge nodes 303 and 313, references to the workload queues 304 and 314 are added to the remote queues 306, 316 and/or the local queues 307, 317. When workload queues of edge nodes become empty, references to those workload queues are removed from the remote queues 306, 316 and/or the local queues 307, 317. For example, since edge node E2N2 is shown as processing workload W16, the E2N2 workload queue 314-2 is empty and there is no reference to E2N2 in the listing of remote queues 306 and the listing of local queues 317. Similar to FIG. 1, FIG. 3 represents a particular snapshot in time for edge locations E1 301 and E2 310, where edge nodes E1N1 303-1, E1N3 303-3 and E2N3 313-3 are denoted as "idle." Edge nodes E1N2 303-2, E2N1 313-1 and E2N2 313-2 are denoted as "busy" since they are processing workloads W11, W14 and W16, respectively. Edge node E1N1 303-1 is about to process workload W9 from its workload queue 304-1.

In accordance with the embodiments, idle edge nodes in either edge location E1 301 or E2 310 are configured to execute a workload stealing algorithm to pull workloads Wn or Wx from workload queues of busy edge nodes in their edge location or from a remote edge location. For example, in FIG. 3, idle edge node E1N3 303-3 is stealing workload W12 from the local E1N2 workload queue 304-2 of busy edge node E1N2 303-2 and is about to process workload W12. Idle edge node E2N3 313-3 in edge location E2 310 is stealing workload W13 from the remote E1N2 workload queue 304-2 of busy edge node E1N2 303-2 in edge location E1 301 and is about to process workload W13.

A technical solution of the embodiments is to configure idle edge nodes from a first edge location to actively pull workloads from edge node workload queues in a second edge location different from the first edge location. According to the embodiments, multiple edge locations (in this case edge locations E1 301 and E2 310) maintain views of each other's queued workloads in their remote queues (e.g., remote queues 306 and 316), along with their own queued workloads in local queues (e.g., local queues 307 and 317). When an edge node is idle, the idle edge node will check its local queue and the remote queue for workloads to steal. Depending on workload stealing constraints of a workload stealing algorithm as described in more detail herein below, if workloads are available in a local queue, the idle edge node may pull local workloads first, and available workloads from a remote queue after workloads in a local queue have been exhausted. Alternatively, if proximity of an edge node to a workload from another edge node is not a constraint, or there are other overriding factors that would preclude an idle edge node from pulling workloads from a local queue, then the idle edge node may pull a workload from a remote queue over workloads from a local queue. For example, in the case of workload W13, depending on the specified constraints in a workload stealing algorithm, edge node E2N3 313-3, although remote from the E1N2 workload queue 304-2 and edge node E1N2 303-2, steals workload W13 instead of workload W15 from the E2N1 workload queue 314-1. If no workloads are available to steal (e.g., the local and remote queues are empty), idle edge nodes remain idle and wait for scheduled workloads from a scheduler.

The constraints of a workload stealing algorithm governing whether a given edge node is permitted to pull workloads from a queue of another edge node can include, but are not necessarily limited to, edge node location, workload processing performance, workload processing cost, edge node capabilities, energy efficiency of an edge node and/or security. For example, as noted above, preference for acquiring workloads from the workload queue of another edge node may be given to edge nodes in closer proximity to workloads being acquired. In another example, if a workload requires an operation to run at a given efficiency and/or a user has specified an energy efficiency requirement, an edge node capable of meeting the energy efficiency requirements may steal the workload from another edge node not capable of meeting the energy efficiency requirements. In some embodiments, workloads may only be stolen if the stealing node meets a user's preferences and requirements, such as, for example, workload processing cost and performance constraints, whether the edge node has certain memory, processing or storage capabilities (e.g., capacity, bandwidth, etc.) and/or meets specified energy efficiency and/or security constraints. Such security constraints may comprise, for example, restricting user access and/or running certain types of isolation, authentication and/or encryption protocols. Other types of constraints may include, for example, latency requirements (e.g., thresholds), estimated workload completion time frame, software and/or hardware types in the edge nodes and/or the number of machines workloads can be split across. In some embodiments, workloads can be scheduled with instructions not to be stolen from the workload queue of a specified edge node for reasons such as, but not necessarily limited to, security, locality and/or resources. Alternatively, edge node workload queues and/or workloads themselves can include specifications to allow stealing by edge nodes at secondary (e.g., remote) locations, effectively implementing workload stealing between different edge locations. Workloads and workload queues may include commands and/or metadata specifying constraints for the particular workload and/or workload queue. The scope of the stealing (by edge nodes within the same edge location or different edge locations) can further be specified by an edge utility provider and/or consumer in a workload stealing algorithm.

According to one or more embodiments, the access by edge nodes from a first edge location to workloads in a second edge location and vice versa is managed by a workload stealing communication protocol executed between respective first and second workload schedulers of the first and second edge locations. For example, referring back to FIG. 3, requests for workloads Wn, Wx and transmission of workloads Wn, Wx between edge locations E1 301 and E2 310 is managed by a workload stealing communication protocol executed between schedulers 302 and 312. For example, the request for workload W13 from and transmission of workload W13 to edge node E2N3 313-3 is managed by the workload stealing communication protocol executed between schedulers 302 and 312. It is to be understood that although two edge locations E1 301 and E2 310 are shown in FIG. 3, the embodiments are not necessarily limited thereto, and workload stealing may be performed between more than two edge locations.

Figure 4:
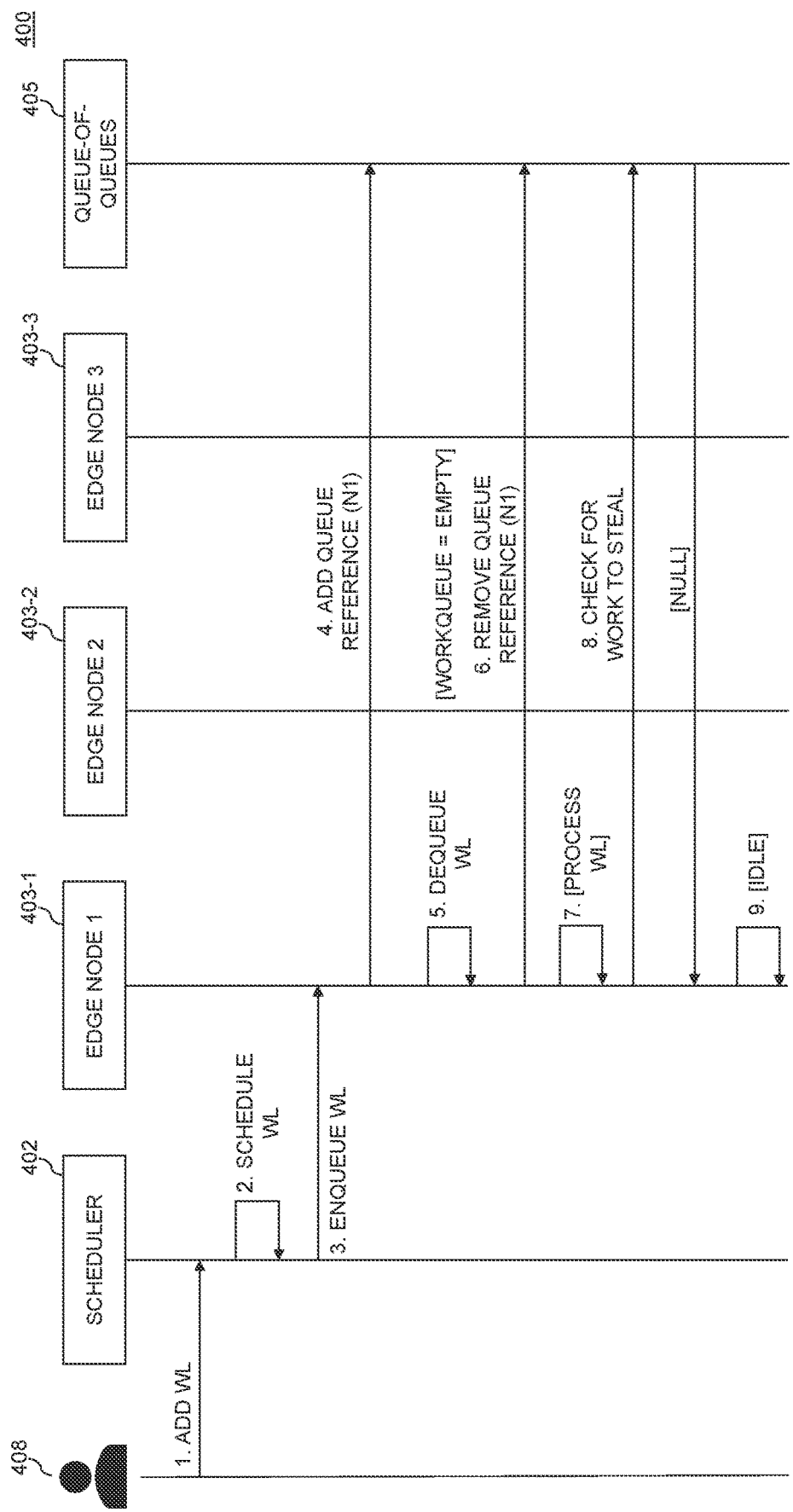
FIG. 4 is an operational flow diagram illustrating scheduling of a new edge workload in an illustrative embodiment.

Referring to the operational flow 400 for scheduling and processing of a new edge workload in FIG. 4, at step 1 ("Add WL"), a new workload (WL) is received by a scheduler 402 at an edge location. The new workload may be sent by a user 408 via a user device to the edge location. At step 2 ("Schedule WL"), the scheduler 402 determines whether the workload should be assigned to edge node 1 403-1, edge node 2 403-2 or edge node 3 403-3. As can be seen in step 3 ("Enqueue WL"), the scheduler 402 assigns the workload to edge node 1 403-1 and the workload is added to the workload queue for edge node 1 403-1. At step 4 ("Add Queue Reference (N1)"), a reference to the workload queue for edge node 1 403-1 is added to a queue-of-queues 405 for the edge location. As explained herein, the queue-of-queues 405 can be accessed by the edge nodes 403 to find references to other workload queues so that the edge nodes 403 can pull workloads from the workload queues of other edge nodes.

At step 5 ("Dequeue WL"), edge node 1 403-1 pulls the new workload from its workload queue for processing. At step 6 ("[WorkQueue=Empty] Remove Queue Reference (N1)"), if the workload queue for edge node 1 403-1 is empty after pulling the new workload for processing, the reference to the workload queue for edge node 1 403-1 is removed from the queue-of-queues 405. At step 7 ("Process WL"), the dequeued workload is processed by edge node 1 403-1. At step 8 ("Check for Work to Steal"), when processing of the dequeued workload is completed by edge node 1 403-1, and its corresponding workload queue is empty, idle edge node 1 403-1 checks for workloads to steal from other edge node workload queues by, for example, referring to the queue-of-queues 405. In this case, there are no workloads to steal ("[Null]"). For example, the workload queues of edge nodes 2 and 3 403-2 and 403-3 are empty and there are no references to edge node workload queues in the queue-of-queues 405. At step 9 ("[Idle]"), since no workloads are available to steal, edge node 1 403-1 remains idle until new workloads are scheduled by scheduler 402.

Figure 5:
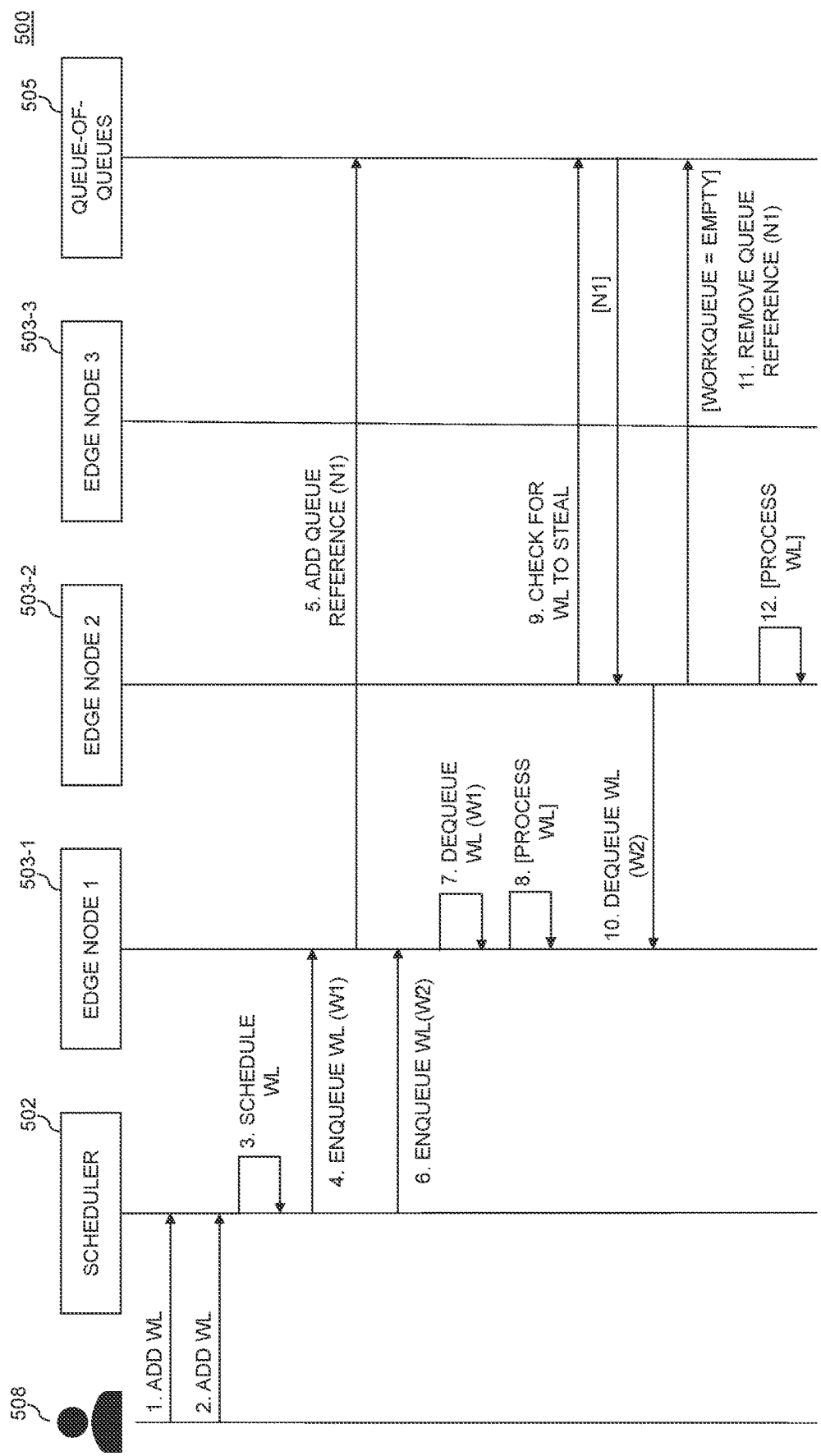
FIG. 5 is an operational flow diagram illustrating workload acquisition in an illustrative embodiment.

Referring to the operational flow 500 for workload stealing in FIG. 5, at steps 1 and 2 ("Add WL"), new workloads (WL) are received by a scheduler 502 at an edge location. The new workloads may be sent by a user 508 via a user device to the edge location. At step 3 ("Schedule WL"), the scheduler 502 determines whether the workloads should be assigned to edge node 1 503-1, edge node 2 503-2 and/or edge node 3 503-3. As can be seen in step 4 ("Enqueue WL (W1)"), the scheduler 502 assigns a first workload (W1) to edge node 1 503-1 and the first workload (W1) is added to the workload queue for edge node 1 503-1. At step 5 ("Add Queue Reference (N1)"), a reference to the workload queue for edge node 1 503-1 is added to a queue-of-queues 505 for the edge location. As explained herein, the queue-of-queues 505 can be accessed by the edge nodes 503 to find references to other workload queues and so that the edge nodes 503 can pull workloads from the workload queues of other edge nodes. In step 6 ("Enqueue WL (W2)"), the scheduler 502 assigns a second workload (W1) to edge node 1 503-1 and the second workload (W2) is added to the workload queue for edge node 1 503-1.

At step 7 ("Dequeue WL (W1)"), edge node 1 503-1 pulls the first workload (W1) from its workload queue for processing. At step 8 ("Process WL"), the dequeued first workload (W1) is processed by edge node 1 503-1. In the meantime, edge node 2 503-2 completes its processing of the workload(s) in the workload queue for edge node 2 503-2 so that its workload queue is empty. At step 9 ("Check for Work to Steal"), idle edge node 2 503-2 checks for workloads to steal from other edge node workload queues by, for example, referring to the queue-of-queues 505. From the queue-of-queues 505, edge node 2 503-2 identifies a reference to the workload queue of edge node 1 503-1 ("[N1]"). At step 10 ("Dequeue WL (W2)"), edge node 2 503-2 pulls the second workload (W2) from the workload queue of edge node 1 503-1 for processing. At step 11 ("[WorkQueue=Empty]

Remove Queue Reference (N1)"), if the workload queue for edge node 1 503-1 is empty after pulling the second workload (W2) for processing, the reference to the workload queue for edge node 1 503-1 is removed from the queue-of-queues 505. At step 12 ("Process WL"), the dequeued second workload (W2) is processed by edge node 2 503-2.

Workload queues (e.g., workload queues 104, 204, 304, 314), queue-of queues (e.g., queue-of-queues 105, 405, 505), remote queues (e.g., remote queues 306, 316) and local queues (e.g., local queues 307, 317) may run on their own respective devices or run on the same devices as the edge nodes or schedulers.

The schedulers 102, 302, 312, 402 and 502, edge nodes 103, 203, 303, 313, 403 and 503, and other edge location components in the embodiments are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or containers (e.g., Linux containers (LXCs)), or combinations of both as in an arrangement in which Docker containers or other types of LXCs are configured to run on VMs.

The schedulers 102, 302, 312, 402 and 502 and edge nodes 103, 203, 303, 313, 403 and 503 (or one or more components thereof), as well as other edge location components may be implemented on respective distinct processing platforms, although numerous other arrangements are possible. For example, in some embodiments at least portions of one or more of the schedulers 102, 302, 312, 402 and 502 and one or more of the edge nodes 103, 203, 303, 313, 403 and 503 are implemented on the same processing platform.

Additionally, the schedulers 102, 302, 312, 402 and 502, edge nodes 103, 203, 303, 313, 403 and 503, and other edge location components in some embodiments may be implemented as part of a cloud-based system (e.g., a cloud service provider). The schedulers 102, 302, 312, 402 and 502, edge nodes 103, 203, 303, 313, 403 and 503, and other edge location components can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. Communications to and from schedulers, edge nodes, edge locations and/or devices including, for example, workload queues, queue-of-queues, remote queues and local queues, may take place over one or more networks as described herein. The term "processing platform" as used herein is intended to be broadly construed so as to encompass, by way of illustration and without limitation, multiple sets of processing devices and one or more associated storage systems that are configured to communicate over one or more networks. Additional examples of processing platforms utilized to implement portions of the edge locations 101, 301 and 310 and the components thereof in illustrative embodiments will be described in more detail below in conjunction with FIGS. 7 and 8.

It is to be understood that the particular set of elements shown are presented by way of illustrative example only, and in other embodiments additional or alternative elements may be used. Thus, another embodiment may include additional or alternative systems, devices and other network entities, as well as different arrangements of modules and other components. It is to be appreciated that these and other features of illustrative embodiments are presented by way of example only, and should not be construed as limiting in any way.

An exemplary process for utilizing workload stealing to distribute edge workloads between edge nodes will now be described in more detail with reference to the flow diagram of FIG. 6. It is to be understood that this particular process is only an example, and that additional or alternative processes for utilizing workload stealing to distribute edge workloads between edge nodes can be carried out in other embodiments.

The process 600 as shown includes steps 602 through 606, and is suitable for use in the edge locations 101, 301 and/or 310 but is more generally applicable to other types of systems where workload stealing is utilized to distribute edge workloads between edge nodes. Other arrangements of schedulers, edge nodes, edge locations and/or other system components can be configured to perform at least portions of one or more of the steps in other embodiments.

In step 602, a plurality of workloads are received, and in step 604, the plurality of workloads are assigned to respective ones of a plurality of workload queues corresponding to respective ones of a plurality of edge nodes.

In step 606, a workload acquiring algorithm is executed at a first edge node of the plurality of edge nodes to pull at least one workload of the plurality of workloads from a workload queue corresponding to a second edge node of the plurality of edge nodes. According to the embodiments, executing the workload acquiring algorithm comprises implementing one or more constraints governing whether the first edge node is permitted to pull workloads from the workload queue corresponding to the second edge node, or whether a given edge node of the plurality of edge nodes is permitted to pull workloads from a queue of another edge node of the plurality of edge nodes. The one or more constraints comprise, but are not necessarily limited to, edge node location, workload processing performance, workload processing cost, edge node capabilities, energy efficiency and/or security.

In one or more embodiments, the first edge node processes one or more workloads of the plurality of workloads in a workload queue corresponding to the first edge node, wherein the processing is performed until the workload queue corresponding to the first edge node is empty. The executing the workload acquiring algorithm comprises pulling, by the first edge node, the at least one workload from a workload queue corresponding to the second edge node following emptying of the workload queue corresponding to the first edge node, and processing, by the first edge node, the at least one workload from the workload queue corresponding to the second edge node.

A new workload may be spawned during processing of the one or more workloads in the workload queue corresponding to the first edge node, and the new workload may be added to the workload queue corresponding to the first edge node. According to one or more embodiments, the new workload is available for acquisition from the workload queue corresponding to the first edge node by an edge node of the plurality of edge nodes other than the first edge node, which can pull the new workload from the workload queue, and process the new workload.

A primary queue comprising references to the plurality of workload queues is created. A reference to a given one of the plurality of workload queues is removed from the primary queue responsive to emptying of the given one of the plurality of workload queues. The first edge node, which is idle, finds a reference to the at least one workload in the primary queue and pulls the at least one workload from the workload queue corresponding to the second edge node responsive to the finding of the reference to the at least one workload in the primary queue.

In accordance with at least one embodiment, the plurality of edge nodes are components of a first edge location, and one or more edge nodes from a second edge location different from the first edge location are provided with access to the plurality of workloads from the respective ones of the plurality of workload queues in the first edge location. One or more idle edge nodes from the second edge location pull a given one of the plurality of workloads from its corresponding workload queue in the first edge location, and process the given one of the plurality of workloads. At least one of the plurality of edge nodes in the first location is provided with access to, pulls and processes one or more workloads from one or more workload queues corresponding to the one or more edge nodes from the second edge location. For example, according to an embodiment, the first edge node is a component of the first edge location, and is provided with access to the one or more workloads from the one or more workload queues corresponding to one or more edge nodes from the second edge location. The first edge node pulls and processes at least one of the one or more workloads from the one or more workload queues corresponding to the one or more edge nodes from the second edge location.

The access by the one or more edge nodes from the second edge location to the plurality of workloads from the respective ones of the plurality of workload queues in the first edge location, and the access by the at least one of the plurality of edge nodes in the first edge location to the one or more workloads from the one or more workload queues corresponding to the one or more edge nodes from the second edge location is managed by a workload acquiring communication protocol. The workload acquiring communication protocol is executed between respective first and second workload schedulers of the first and second edge locations.

In accordance with one or more embodiments, a local primary queue comprising references to the plurality of workload queues corresponding to the respective ones of the plurality of edge nodes in the first edge location is created in the first edge location. A remote primary queue comprising references to one or more workload queues corresponding to the one or more edge nodes from the second edge location is also created in the first edge location.

A local primary queue comprising references to one or more workload queues corresponding to the one or more edge nodes from the second edge location is created in the second edge location. A remote primary queue comprising references to the plurality of workload queues corresponding to the respective ones of the plurality of edge nodes in the first location is created in the second edge location.

Figure 6:
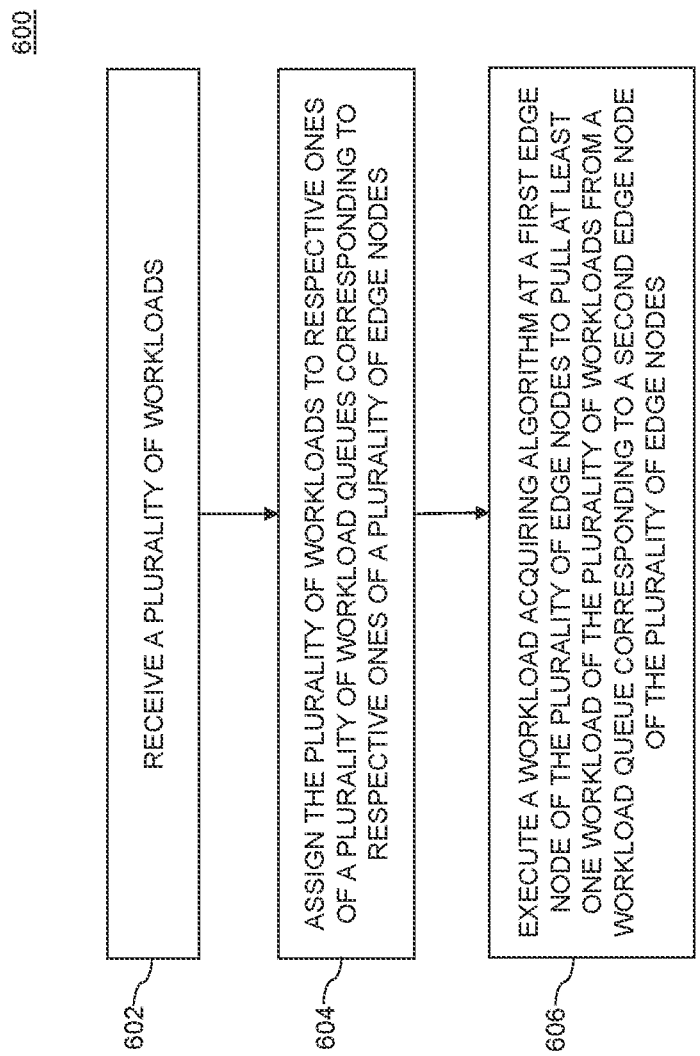
FIG. 6 is a flow diagram of an exemplary process for utilizing workload acquisition to distribute edge workloads between edge nodes in an illustrative embodiment.

It is to be appreciated that the FIG. 6 process and other features and functionality described above can be adapted for use with other types of systems configured to utilize workload stealing to distribute edge workloads between edge nodes.

The particular processing operations and other system functionality described in conjunction with the flow diagram of FIG. 6 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions that implement a self-balanced schedule of workloads. For example, if an edge node N2 103-2 has a greater number of workloads queued than edge nodes N1 103-1 and N3 103-3, the other edge nodes are configured to potentially steal workloads from the workload queue of edge node N2 103-2 in order to balance processing across available edge nodes. Advantageously, the pulling of workloads from busy edge nodes by idle edge nodes can be accomplished without manual intervention.

Limitations of workload schedulers and scheduling algorithms can negatively impact edge workload distribution and processing. For example, unanticipated and unpredictable variations in workload completion times and delays due to, for example, input-output operations, can skew the distribution of workload processing across edge nodes, resulting in inefficient usage of resources. Additionally, workloads processed by an edge node may spawn additional workloads for that node that are not otherwise visible to an originating scheduler, resulting in an overburdened edge node while other nodes are potentially idle.

The embodiments address these concerns by providing technical solutions which increase parallelization of workload processing. As edge nodes steal work from other occupied edge nodes, workloads execute across multiple available edge nodes in parallel. As more edge nodes are deployed and more workloads are queued, parallelization of processing increases without manual intervention or manual configuration.

Advantageously, the embodiments also provide technical solutions which avoid overburdening of edge nodes, by efficiently distributing spawned additional workloads to different edge nodes so that issues such as, for example, latency can be avoided. As an additional advantage, because the system is based upon edge node availability (e.g., idle edge nodes steal workloads of other edge nodes), the result is a self-governing and efficient distribution of workloads across available edge nodes.

The embodiments also provide for tailoring of workload stealing algorithms to restrict workload stealing under certain conditions or constraints. For example, due to security, locality, resources or other reasons, workloads can be scheduled with instructions not to be stolen from a workload queue of a particular edge node. The workload stealing algorithm can be tailored to consider cost, performance, energy efficiency and other factors when pulling or attempting to pull workloads from other edge nodes. Such constraints can be applied when stealing workloads within an edge location, and between edge locations.

It is to be appreciated that the particular advantages described above and elsewhere herein are associated with particular illustrative embodiments and need not be present in other embodiments. Also, the particular types of information processing systems and/or edge location features and functionality as illustrated in the drawings and described above are exemplary only, and numerous other arrangements may be used in other embodiments.

As noted above, at least portions of the edge locations (e.g., edge locations 101, 301 and 310), including the schedulers 102, 302, 312, 402 and 502 and edge nodes 103, 203, 303, 313, 403 and 503, may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise a cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the edge nodes 103, 203, 303, 313, 403 and 503 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud service provider in illustrative embodiments.

Illustrative embodiments of processing platforms utilized to implement functionality for utilizing workload stealing to distribute edge workloads between edge nodes will now be described in greater detail with reference to FIGS. 7 and 8. Although described in the context of edge locations 101, 301 and 310 or other edge locations, these platforms may also be used to implement at least portions of other information processing systems in other embodiments.

Figure 7:
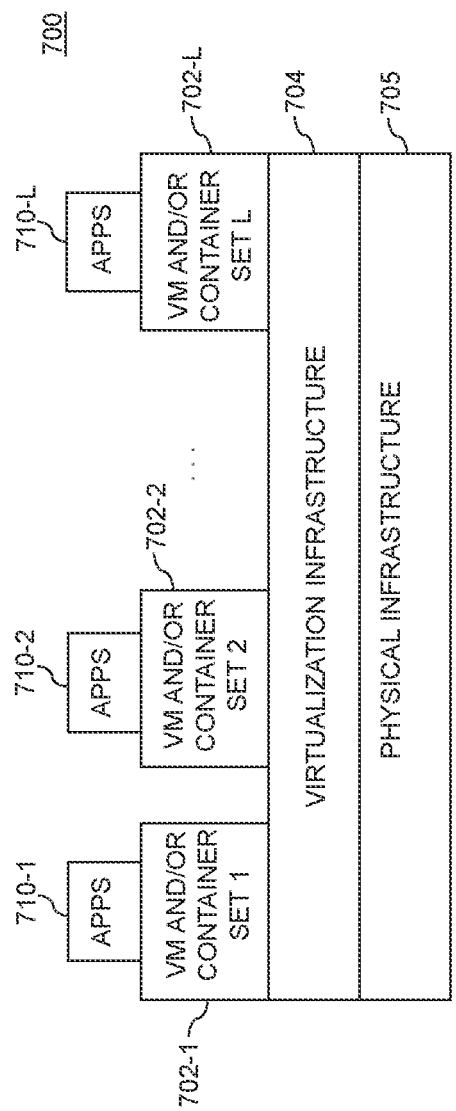
FIGS. 7 and 8 show examples of processing platforms that may be utilized to implement at least a portion of an information processing system used to distribute edge workloads between edge nodes in illustrative embodiments.
Figure 8:
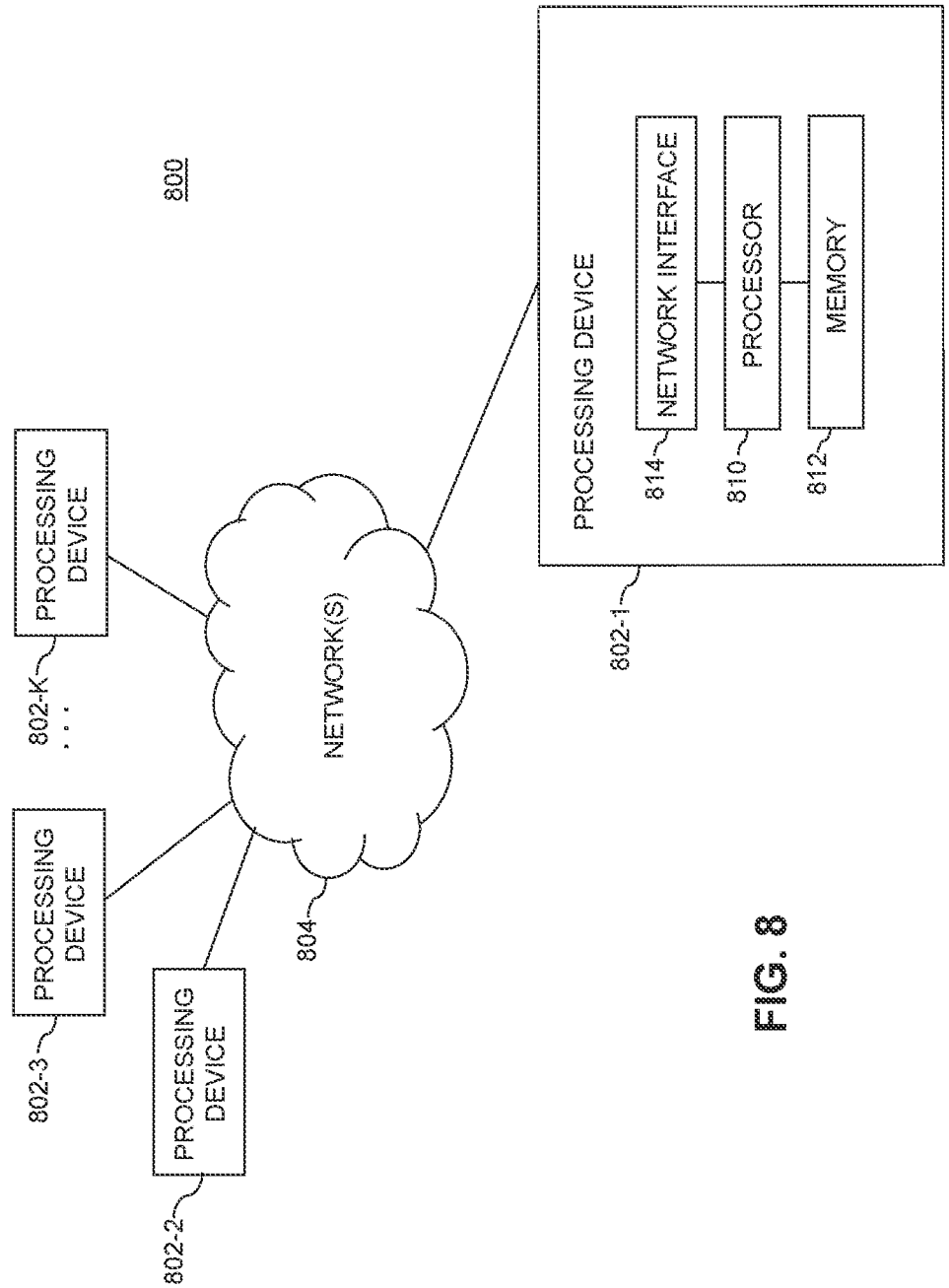

FIG. 7 shows an example processing platform comprising cloud infrastructure 700. The cloud infrastructure 700 comprises a combination of physical and virtual processing resources that may be utilized to implement at least a portion of the edge locations 101, 301 and 310 or other edge locations. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of edge locations 101, 301 and 310 or other edge locations may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of edge locations 101, 301 and 310 or other edge locations or the components thereof, and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the edge locations 101, 301 and 310 or other edge locations may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for utilizing workload stealing to distribute edge workloads between edge nodes attached thereto as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge locations, edge nodes, schedulers, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    executing a workload acquiring algorithm at a first edge node of a plurality of edge nodes to pull at least one workload of a plurality of workloads from a workload queue corresponding to a second edge node of the plurality of edge nodes;
    wherein the plurality of workloads are assigned to respective ones of a plurality of workload queues corresponding to respective ones of the plurality of edge nodes, wherein a primary queue list comprises references to the plurality of workload queues, wherein respective ones of the references are added to the primary queue list responsive to addition of at least one workload of the plurality of workloads to respective ones of the plurality of workload queues, and wherein the respective ones of the references identify respective ones of the plurality of edge nodes corresponding to the respective ones of the plurality of workload queues;
    wherein executing the workload acquiring algorithm comprises:
    querying the primary queue list for one or more of the references to the plurality of workload queues;
    finding a reference to the workload queue corresponding to the second edge node of the plurality of edge nodes in the primary queue list, the reference identifying the second edge node;
    pulling the at least one workload from the workload queue corresponding to the second edge node responsive to the finding of the reference to the workload queue corresponding to the second edge node, wherein the at least one workload is awaiting processing by the second edge node; and
    processing, by the first edge node, the at least one workload from the workload queue corresponding to the second edge node;
    wherein, after the pulling and the processing, the reference to the workload queue corresponding to the second edge node is maintained in the primary queue list when one or more workloads remain in the workload queue corresponding to the second edge node; and
    wherein, prior to the processing, the reference to the workload queue corresponding to the second edge node is removed from the primary queue list when the pulling empties the workload queue corresponding to the second edge node; and
    wherein the method is performed by at least one processing device comprising a processor coupled to a memory.

2. The method of claim 1, further comprising:
    processing, by the first edge node, one or more workloads of the plurality of workloads in a workload queue corresponding to the first edge node, wherein the processing is performed until the workload queue corresponding to the first edge node is empty; and
    wherein the pulling of the at least one workload from the workload queue corresponding to the second edge node is performed following emptying of the workload queue corresponding to the first edge node.

3. The method of claim 2, further comprising:
    spawning a new workload during the processing of the one or more workloads in the workload queue corresponding to the first edge node; and
    adding the new workload to the workload queue corresponding to the first edge node.

4. The method of claim 3, wherein the new workload is available for acquisition from the workload queue corresponding to the first edge node by an edge node of the plurality of edge nodes other than the first edge node.

5. The method of claim 1, wherein the plurality of edge nodes are components of a first edge location, and one or more edge nodes from a second edge location different from the first edge location are provided with access to the plurality of workloads from the respective ones of the plurality of workload queues.

6. The method of claim 5, wherein a given one of the plurality of workloads is pulled from its corresponding workload queue and processed by one or more edge nodes from the second edge location.

7. The method of claim 5, wherein:
a first primary queue list in the first edge location comprises references to the plurality of workload queues corresponding to the respective ones of the plurality of edge nodes from the first edge location; and
a second primary queue list in the first edge location comprises references to one or more workload queues corresponding to the one or more edge nodes from the second edge location.

8. The method of claim 7, wherein:
a first primary queue list in the second edge location comprises references to the one or more workload queues corresponding to the one or more edge nodes from the second edge location; and
a second primary queue list in the second edge location comprises references to the plurality of workload queues corresponding to the respective ones of the plurality of edge nodes from the first edge location.

9. The method of claim 1, wherein the first edge node is a component of a first edge location, and the method further comprises providing the first edge node with access to one or more second edge location workloads from one or more workload queues corresponding to one or more edge nodes from a second edge location different from the first edge location.

10. The method of claim 9, wherein executing the workload acquiring algorithm further comprises:
pulling, by the first edge node, at least one of the one or more second edge location workloads from the one or more workload queues corresponding to the one or more edge nodes from the second edge location; and
processing, by the first edge node, the at least one of the one or more second edge location workloads from the one or more workload queues corresponding to the one or more edge nodes from the second edge location.

11. The method of claim 9, wherein the access by the first edge node to the one or more second edge location workloads from the one or more workload queues corresponding to the one or more edge nodes from the second edge location is managed by a workload acquiring communication protocol executed between respective first and second workload schedulers of the first and second edge locations.

12. The method of claim 1, wherein executing the workload acquiring algorithm further comprises implementing one or more constraints governing whether the first edge node is permitted to pull workloads from the workload queue corresponding to the second edge node, the one or more constraints comprising at least one of an edge node location constraint, a workload processing performance constraint, a workload processing cost constraint, an edge node capability constraint, an energy efficiency constraint, and a security constraint.

13. The method of claim 1, wherein executing the workload acquiring algorithm further comprises implementing at least one constraint governing whether the first edge node is permitted to pull workloads from the workload queue corresponding to the second edge node, the at least one constraint comprising an edge node location constraint.

14. An apparatus, comprising:
at least one processor and at least one memory storing computer program instructions wherein, when the at least one processor executes the computer program instructions, the apparatus is configured:
to execute a workload acquiring algorithm at a first edge node of a plurality of edge nodes to pull at least one workload of a plurality of workloads from a workload queue corresponding to a second edge node of the plurality of edge nodes;
wherein the plurality of workloads are assigned to respective ones of a plurality of workload queues corresponding to respective ones of the plurality of edge nodes, wherein a primary queue list comprises references to the plurality of workload queues, wherein respective ones of the references are added to the primary queue list responsive to addition of at least one workload of the plurality of workloads to respective ones of the plurality of workload queues, and wherein the respective ones of the references identify respective ones of the plurality of edge nodes corresponding to the respective ones of the plurality of workload queues;
wherein, in executing the workload acquiring algorithm, the apparatus is configured:
to query the primary queue list for one or more of the references to the plurality of workload queues;
to find a reference to the workload queue corresponding to the second edge node of the plurality of edge nodes in the primary queue list, the reference identifying the second edge node;
to pull the at least one workload from the workload queue corresponding to the second edge node responsive to the finding of the reference to the workload queue corresponding to the second edge node, wherein the at least one workload is awaiting processing by the second edge node; and
to process, by the first edge node, the at least one workload from the workload queue corresponding to the second edge node;
wherein, after the pulling and the processing, the reference to the workload queue corresponding to the second edge node is maintained in the primary queue list when one or more workloads remain in the workload queue corresponding to the second edge node; and
wherein, prior to the processing, the reference to the workload queue corresponding to the second edge node is removed from the primary queue list when the pulling empties the workload queue corresponding to the second edge node.

15. The apparatus of claim 14, wherein the first edge node is a component of a first edge location, and the apparatus is further configured to provide the first edge node with access to one or more second edge location workloads from one or more workload queues corresponding to one or more edge nodes from a second edge location different from the first edge location.

16. The apparatus of claim 14, wherein, in executing the workload acquiring algorithm, the apparatus is further configured to implement one or more constraints governing whether the first edge node is permitted to pull workloads from the workload queue corresponding to the second edge node, the one or more constraints comprising at least one of an edge node location constraint, a workload processing performance constraint, a workload processing cost constraint, an edge node capability constraint, an energy efficiency constraint, and a security constraint.

17. The apparatus of claim 15, wherein, in executing the workload acquiring algorithm, the apparatus is configured:

to pull at least one of the one or more second edge location workloads from the one or more workload queues corresponding to the one or more edge nodes from the second edge location; and to process the at least one of the one or more second edge location workloads from the one or more workload queues corresponding to the one or more edge nodes from the second edge location.

18. A computer program product stored on a non-transitory computer-readable medium and comprising machine executable instructions, the machine executable instructions, when executed, causing a processing device:

to execute a workload acquiring algorithm at a first edge node of a plurality of edge nodes to pull at least one workload of a plurality of workloads from a workload queue corresponding to a second edge node of the plurality of edge nodes;

wherein the plurality of workloads are assigned to respective ones of a plurality of workload queues corresponding to respective ones of the plurality of edge nodes, wherein a primary queue list comprises references to the plurality of workload queues, wherein respective ones of the references are added to the primary queue list responsive to addition of at least one workload of the plurality of workloads to respective ones of the plurality of workload queues, and wherein the respective ones of the references identify respective ones of the plurality of edge nodes corresponding to the respective ones of the plurality of workload queues;

wherein, in executing the workload acquiring algorithm, the machine executable instructions cause the processing device:

to query the primary queue list for one or more of the references to the plurality of workload queues;

to find a reference to the workload queue corresponding to the second edge node of the plurality of edge nodes in the primary queue list, the reference identifying the second edge node;

to pull the at least one workload from the workload queue corresponding to the second edge node responsive to the finding of the reference to the workload queue corresponding to the second edge node, wherein the at least one workload is awaiting processing by the second edge node; and to process, by the first edge node, the at least one workload from the workload queue corresponding to the second edge node;

wherein, after the pulling and the processing, the reference to the workload queue corresponding to the second edge node is maintained in the primary queue list when one or more workloads remain in the workload queue corresponding to the second edge node; and wherein, prior to the processing, the reference to the workload queue corresponding to the second edge node is removed from the primary queue list when the pulling empties the workload queue corresponding to the second edge node.

19. The computer program product of claim 18, wherein the first edge node is a component of a first edge location, and the machine executable instructions further cause the processing device to provide the first edge node with access to one or more second edge location workloads from one or more workload queues corresponding to one or more edge nodes from a second edge location different from the first edge location.

20. The computer program product of claim 19, wherein, in executing the workload acquiring algorithm, the machine executable instructions further cause the processing device:

to pull at least one of the one or more second edge location workloads from the one or more workload queues corresponding to the one or more edge nodes from the second edge location; and to process the at least one of the one or more second edge location workloads from the one or more workload queues corresponding to the one or more edge nodes from the second edge location.

\* \* \* \* \*